United States Patent
Dickerson et al.

(10) Patent No.: US 7,481,361 B2
(45) Date of Patent: Jan. 27, 2009

(54) METHOD AND SYSTEM FOR IDENTIFYING UNSAFE SYNTHETIC TRANSACTIONS AND MODIFYING PARAMETERS FOR AUTOMATED PLAYBACK

(75) Inventors: Scott Stephen Dickerson, Austin, TX (US); James Nicholas Klazynski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 11/239,505

(22) Filed: Sep. 29, 2005

(65) Prior Publication Data

US 2007/0069005 A1 Mar. 29, 2007

(51) Int. Cl.
*G06Q 40/00* (2006.01)
(52) U.S. Cl. ..................................................... 235/379
(58) Field of Classification Search .................. 235/379
See application file for complete search history.

*Primary Examiner*—Karl D Frech
*Assistant Examiner*—Tae W Kim
(74) *Attorney, Agent, or Firm*—Duke W. Yee; Jeffrey S. LaBaw; Cathrine K. Kinslow

(57) ABSTRACT

A method, apparatus, and computer instructions for identifying unsafe synthetic transactions and modifying parameters for automated playback. Bytecode instrumentation is used to dynamically observe the behavior of application code directly and identify each universal resource locator traversed and parameters passed in a transaction. The bytecode instrumentation may determine, based on the parameters passed, that a parameter in the current transaction is an unsafe parameter, and that the unsafe parameter is associated with a test parameter in a previously overridden transaction. If the unsafe parameter has an associated test parameter, the bytecode instrumentation may dynamically override the unsafe parameter in the current transaction with the test parameter in order to make the transaction safe for synthetic playback. In this manner, transactions may be scheduled for playback as usual, and the bytecode insertion methods ensure that the unsafe parameters in the transactions are automatically overridden for the user.

1 Claim, 5 Drawing Sheets

FIG. 6

| Parameter Name | Parameter Value | Override Value | Global Override |
|---|---|---|---|
| Credit Card Number 602 | 1234567812345678 | 9999999999999999 | ✓ |
| Action 604 | Buy | | |
| | | | |

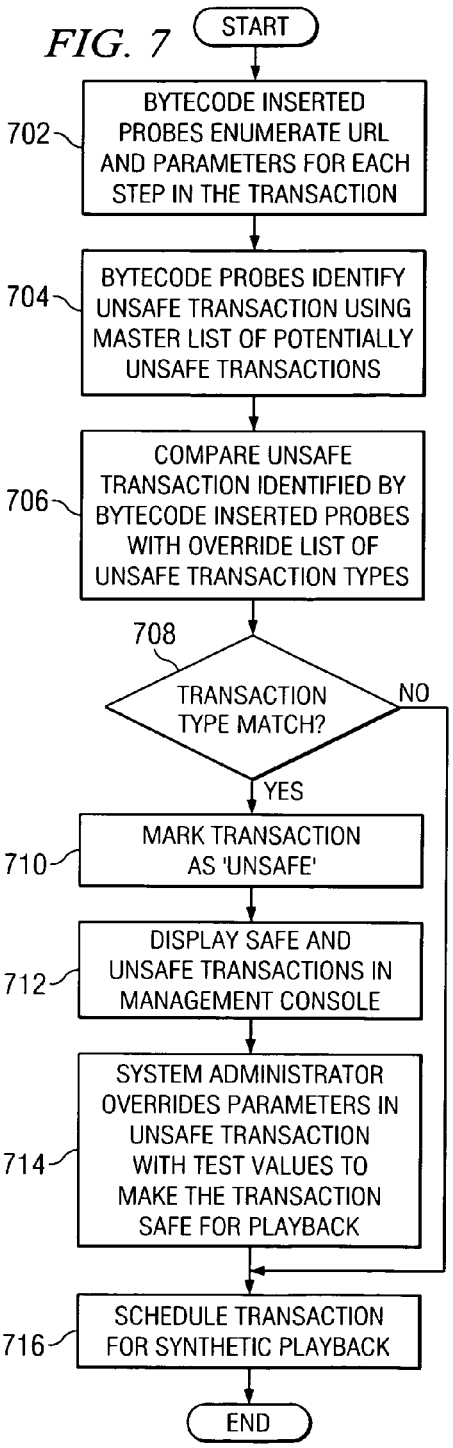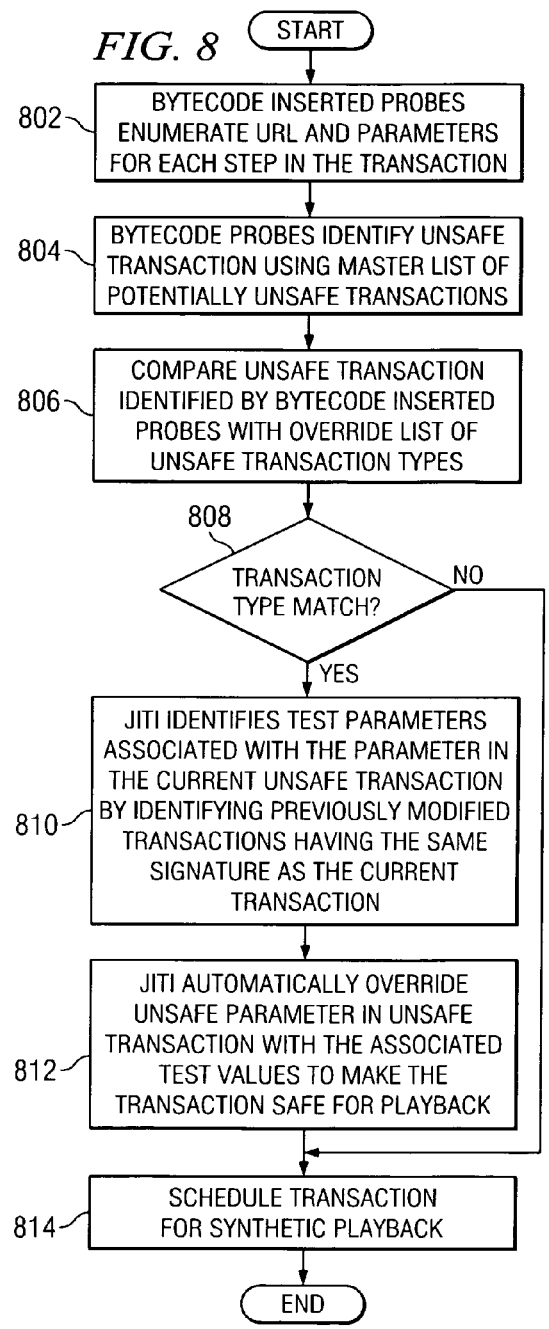

METHOD AND SYSTEM FOR IDENTIFYING UNSAFE SYNTHETIC TRANSACTIONS AND MODIFYING PARAMETERS FOR AUTOMATED PLAYBACK

BACKGROUND OF THE INVENTION

1. Field of the Invention

The present invention relates generally to an improved data processing system, and in particular, to a method, apparatus, and computer instructions for identifying unsafe synthetic transactions and modifying parameters in the transactions to allow for automated playback.

2. Description of the Related Art

Performance monitors are used to capture detailed transaction and application performance data for electronic business transactions. Every step of a customer transaction as it passes through an array of hosts, systems, application, Web and proxy servers, Web application servers, middleware, database management software, and legacy back-end software may be monitored and performance characteristic data compiled and stored in a data repository for historical analysis and long-term planning. One way in which this data may be compiled in order to test the performance of a system is to simulate customer transactions and collect performance data to help assess the health of electronic business components and configurations.

As electronic business owners need to ensure that their Web sites are available and meet performance targets, some performance monitors permit these users to manually record and playback business transactions occurring on their Web sites. A recording component captures performance data about actual user transactions that are executed against elements (e.g., Web servers, Web application servers) of the business environment. A playback component executes the recorded transactions to simulate actual user activity. These simulated transactions are known as synthetic transactions. Recording/playback of transactions allows a business owner to determine the manner by which transactions are processed by the various elements of the electronic business, and thus which processes are causing problems and where the processes may be improved.

Certain recorded transactions may be identified by a business owner as "valuable", meaning that these transactions recorded by the system are transactions that the business owner would want to be synthetically played back and monitored. A problem encountered when playing back recorded transactions is that playback of some transactions may have adverse side effects in the back-end of the enterprise. For example, when a customer purchases a book from an online bookstore, the customer uses a credit card to pay for the book and the recording component of a synthetic transaction engine in the performance monitoring system records the transaction. If, however, the synthetic transaction engine plays back the recorded transaction, a second copy of the book will be sent to the customer and the customer's credit card will again be charged for the book purchase. Synthetic transactions having potentially adverse or destructive consequences if played back are deemed "unsafe" transactions. These unsafe transactions should not be automatically scheduled for synthetic playback without first modifying the transaction to address the adverse side effects.

Currently, a system administrator of a monitoring system addresses this problem by first understanding the Web application and the enterprise back-end. The administrator may modify each unsafe transaction by overriding destructive parameter values in the transaction with test values. A test value is a flagged value that is processed like a customer-entered value, but the test value has no unwanted side effects. An example of a test value is a bogus credit card number that is still processed by a Web service, but no money is added or subtracted from the credit card account. System administrators must currently modify their programming code to check for and override unsafe transactions with safe values at the lower levels (e.g., DB2, Web Services, Java Message Service (JMS), etc.) of the enterprise system. As these safe/unsafe mappings change over time, a system administrator would have to update the code or provide a programming mechanism to update and reflect these new safe/unsafe mappings. As a result, it is very difficult for a system administrator to maintain the logic to check for safe/unsafe transactions and override each type of potential line of logic (e.g., DB2, Web Services, JMS calls, etc.).

Thus, unsafe transactions cannot currently be played back without modification and back-end programming to account for the test values required. Consequently, if a certain transaction does not have test values, the transaction will not be monitored. This situation can be problematic since company management will never know how this monitoring deficiency could potentially impact the business. In addition, system administrators that do not have defined test values to address unsafe transactions may not even realize the limitations of their synthetic transaction coverage. Transaction coverage is the percentage of their critical e-business transactions that are covered by their recorded synthetic transaction coverage.

Therefore, it would be advantageous to have improved mechanism for identifying unsafe synthetic transactions and modifying transaction parameters for automated playback.

SUMMARY OF THE INVENTION

Aspects of present invention provide a method, apparatus, and computer instructions for identifying unsafe synthetic transactions and modifying parameters for automated playback. Recorded transactions may be synthetically played back without causing adverse side effects on the enterprise back-end. Bytecode instrumentation, such as just-in-time-instrumentation, is used to dynamically observe the behavior of application code directly and identify each universal resource locator traversed and parameters passed in a transaction. The bytecode instrumentation may determine, based on the parameters passed, that a parameter in the current transaction is an unsafe parameter, and that the unsafe parameter is associated with a test parameter in a previously overridden transaction. If the unsafe parameter has an associated test parameter, the bytecode instrumentation may dynamically override the unsafe parameter in the current transaction with the test parameter in order to make the transaction safe for synthetic playback. In this manner, transactions may be scheduled for playback as usual, and the bytecode insertion methods ensure that the unsafe parameters in the transactions are automatically overridden for the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an exemplary management display for overriding transaction parameters in an unsafe transaction in accordance with an illustrative embodiment of the present invention;

FIG. 7 is a flowchart outlining an exemplary operation for identifying unsafe synthetic transactions and modifying parameters for transaction playback in accordance with an illustrative embodiment of the present invention; and FIG. 8 is a flowchart outlining an exemplary operation for using just-in-time-instrumentation (JITI) to identify unsafe synthetic transactions and modify parameters for automated transaction playback in accordance with an illustrative embodiment of the present invention.

DETAILED DESCRIPTION OF THE PREFERRED EMBODIMENT

Figure 1:
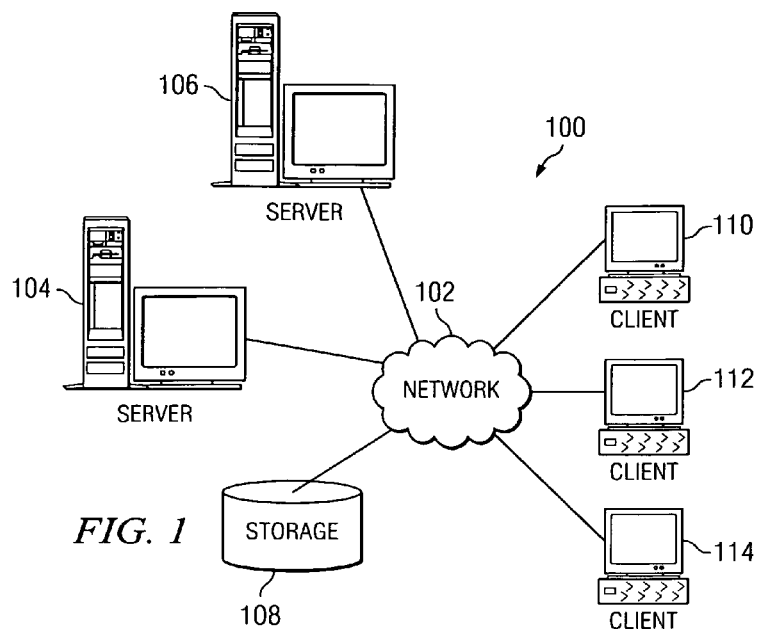
FIG. 1 is an exemplary diagram of a distributed data processing system in which the present invention may be implemented.
Figure 2:
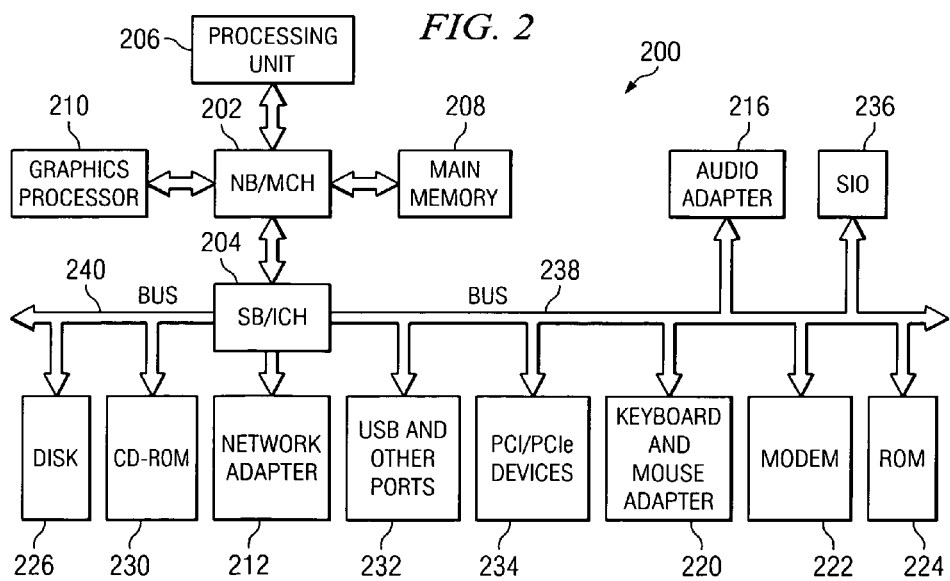
FIG. 2 is an exemplary diagram of a computing device upon which elements of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS). Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed. Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide an improved mechanism for ensuring that recorded transactions may be played back without causing adverse side effects on the enterprise back-end. When playback of a recorded transaction may have destructive consequences on the back-end, the parameters in the transaction must be overridden before the transaction is played back. The mechanism of the present invention addresses this issue by identifying a transaction as "unsafe", and based on this identification, modifies parameters in the transaction to make sure the unsafe transaction may be synthetically played back in a non-destructive manner. The present invention also provides a mechanism for using bytecode insertion methods to automatically insert test parameters into unsafe transactions. The transactions may be scheduled for playback as usual, and the bytecode insertion methods ensure that the unsafe parameters in the transactions are automatically overridden for the user.

With the different aspects of the present invention, customer transactions that have been recorded may be identified as safe or unsafe transactions. A safe transaction is a transaction that will not cause detrimental effects if synthetically played back. Transactions deemed as "safe" may be automatically scheduled for playback and used to synthetically monitor the performance of the business enterprise environment. A transaction is identified as unsafe if an adverse side effect may result if the transaction is played back.

One method of gathering information about transactions is performed using just-in-time-instrumentation (JITI). JITI is a bytecode insertion method which may be used by the performance monitoring system to understand the internals of each transaction (e.g., the type of transaction code) and thereby determine whether a transaction is safe or unsafe. With JITI, bits of code may be inserted into existing software in order to dynamically observe the behavior of the code directly and collect data related to system performance. For example, JITI probes may be placed in computer agents throughout the enterprise system to intercept calls to applications in a Web server and track the Uniform Resource Locators (URLs) visited by customers. A transaction may comprise a list of URLs and a particular subset of transaction parameters.

When these internals of each transaction are known, the synthetic transaction engine of the performance monitoring system may flag specific subtransactions found by JITI that are deemed unsafe. These unsafe transactions found by JITI are compared against a configurable master list of known unsafe transactions. This master list may include default unsafe transactions, such as, for example, any DB2 update or delete query, Web Services call, or Java Message Service (JMS) call as the administrator does not know the content of these transactions. With the different aspects of the present invention, a system administrator may also modify this master list of known unsafe transactions to include other known problematic transactions. For instance, a user may override the defaults and allow certain transactions that contain a specific Web Service call to be automatically scheduled for playback.

If a transaction has been identified as unsafe, the mechanism of the present invention enables playback of the transaction by allowing destructive parameter values in the unsafe transactions to be overridden with test values. A test value is a flagged value that is processed like a user-entered value, but the test value will not create unwanted side effects in the back-end. For example, consider an example of a recording component in the monitoring system recording a transaction where a user purchases a book from an online bookstore and pays for the book using the user's credit card. Although the recorded transaction is an unsafe transaction (playback of the unmodified transaction will cause the user's credit card to be charged again and another book sent to the customer), playback of the transaction should not just be canceled, since information obtained from a playback of the transaction may still be valuable to the business owners.

To obtain this valuable performance information, the system administrator may override the parameter identifying the credit card number in the transaction with a dummy credit card number. In this manner, the transaction may be played back to test the performance of the transaction, but the playback does not actually charge the credit card account again, nor is the user sent another book. This parameter overriding is performed on those transactions identified as unsafe. Thus, any transaction flagged as unsafe will not be played back until the administrator of the monitoring system has indicated that the transaction is safe to playback as long as the parameters in question are overridden with dummy parameters provided by the administrator.

It should be noted that a dummy credit card number is used in this example since the business owners may want to monitor the transaction rather than just canceling it because it is unsafe. Consequently, by replacing a real parameter value contained in the incoming recorded transaction with a dummy value, the recorded transaction is allowed to execute through completion, and the synthetic engine obtains valid performance and availability information. Providing test values for unsafe transactions allows the unsafe transactions to be synthetically played back to monitor the performance of the business enterprise environment.

The parameters in a transaction may be modified manually by a system administrator, automatically modified by the synthetic transaction engine, or automatically modified by the performance monitoring system using bytecode insertion methods if the system already knows which test parameters to insert to make the transaction safe. Initially, the system administrator manually inputs the test parameter value into the management console to override the destructive parameter value in the unsafe transaction. Once an appropriate test value is known for a transaction, automatic test value insertion may be performed for any transaction having the same signature as the overridden transaction using the synthetic transaction engine or JITI. With regard to the synthetic transaction engine, when a transaction is recorded and provided to the synthetic transaction engine for playback, if the parameter value has been provided directly to the transaction server (e.g., a customer types a credit card number in an entry form on a Web site and posts the value to the transaction server using a "submit" button on the Web page, or the value is passed in the URL), the synthetic transaction engine detects the unsafe transaction and overrides the parameter value with a dummy credit card number. The synthetic transaction engine may then automatically playback the modified transaction with the safe parameter values.

With regard to JITI, the parameters may be overridden using JITI in the transaction server. This automatic method may be used when parameter values in a transaction cannot be overridden directly by the synthetic transaction engine. For example, there are some parameters in a transaction that may be obtained based on a customer's login to a Web site. When the customer purchases an item on the Web site, the customer is not prompted for credit card information, since the Web site saved the information in a previous purchase by the customer and the information is indirectly referenced for the customer's user account. In this situation, as there is no way to directly override the parameters in the recorded transaction, JITI may be used to override the existing credit card parameter value to make the parameter a "safe" number.

As test parameters values are required to effectively playback unsafe synthetic transactions, the mechanism of the present invention also assists in identifying potential development areas for a monitored application. A system administrator may query the performance monitoring system to determine how many unsafe transactions have the same servlet parameters. If there are no test values for these parameters, the administrator may ascertain how popular the transactions are, what percentage of transaction and data source coverage is missing, and the likelihood this transaction will fail in the future (based on previous real-world failures). Using these metrics, management may decide if a development effort to generate test values for a data source is necessary.

Figure 3:
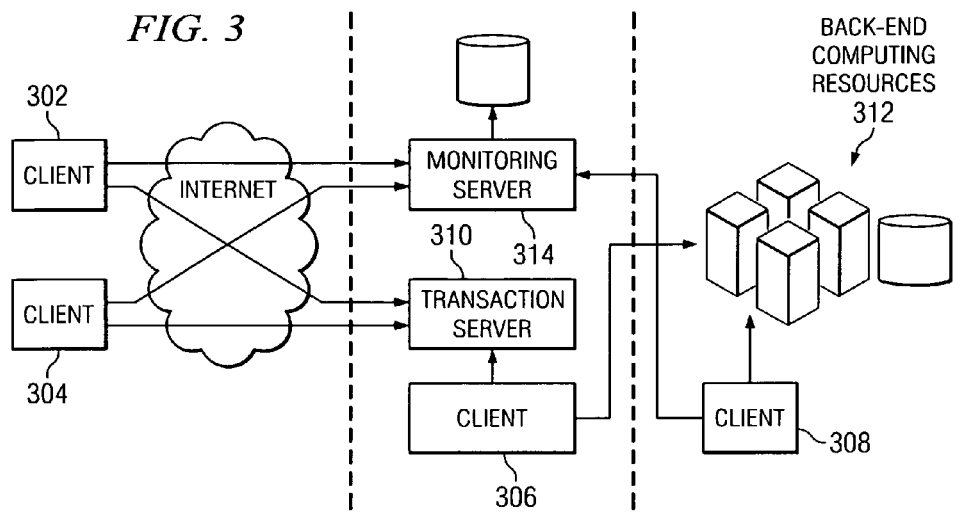
FIG. 3 is a conceptual diagram of an electronic business system transaction performance monitoring architecture in accordance with an illustrative embodiment of the present invention.

Turning now to FIG. 3, an exemplary diagram of an electronic business system transaction performance monitoring architecture is shown in accordance with an illustrative embodiment of the present invention. Client devices 302-308 are examples of client devices such as clients 110-114 in FIG. 1. Transaction server 310 is an example of a server, such as servers 104 and 106 in FIG. 1. Client devices 302-308 may communicate with transaction server 310 in order to obtain access to services provided by the back-end enterprise computing system resources 312. Monitoring server 314 is provided for monitoring the processing of transactions by the transaction server 310 and back-end enterprise computing system resources 312.

Transaction server 310, back-end enterprise computing system resources 312 and monitoring server 314 are part of an enterprise system. Client devices 302-308 may submit requests to the enterprise system via transaction server 310, causing transactions to be created. The transactions are processed by transaction server 310 and back-end enterprise computing system resources 312 with monitoring server 314 monitoring the performance of transaction server 310 and back-end enterprise computing system resources 312 as they process the transactions. The components of transaction server 310 and back-end enterprise computing system resources 312 may include both hardware and software components. For example, the components may include host systems, JAVA Server Pages, servlets, entity beans, Enterprise Java Beans, data connections, and the like. Each component may have its own set of performance characteristics which may be collected and stored by monitoring server 314 in order to obtain an indication as to how the enterprise system is handling transactions. This performance monitoring involves collecting and storing data regarding performance parameters of the various components of transaction server 310 and back-end enterprise computing system resources 312. For example, monitoring of performance may involve collecting and storing information regarding the amount of time a particular component spends processing the transaction, a SQL query, component information including class name and instance id in the Java Virtual Machine (JVM), memory usage statistics, any properties of the state of the JVM, properties of the components of the JVM, and/or properties of the system in general.

Figure 4:
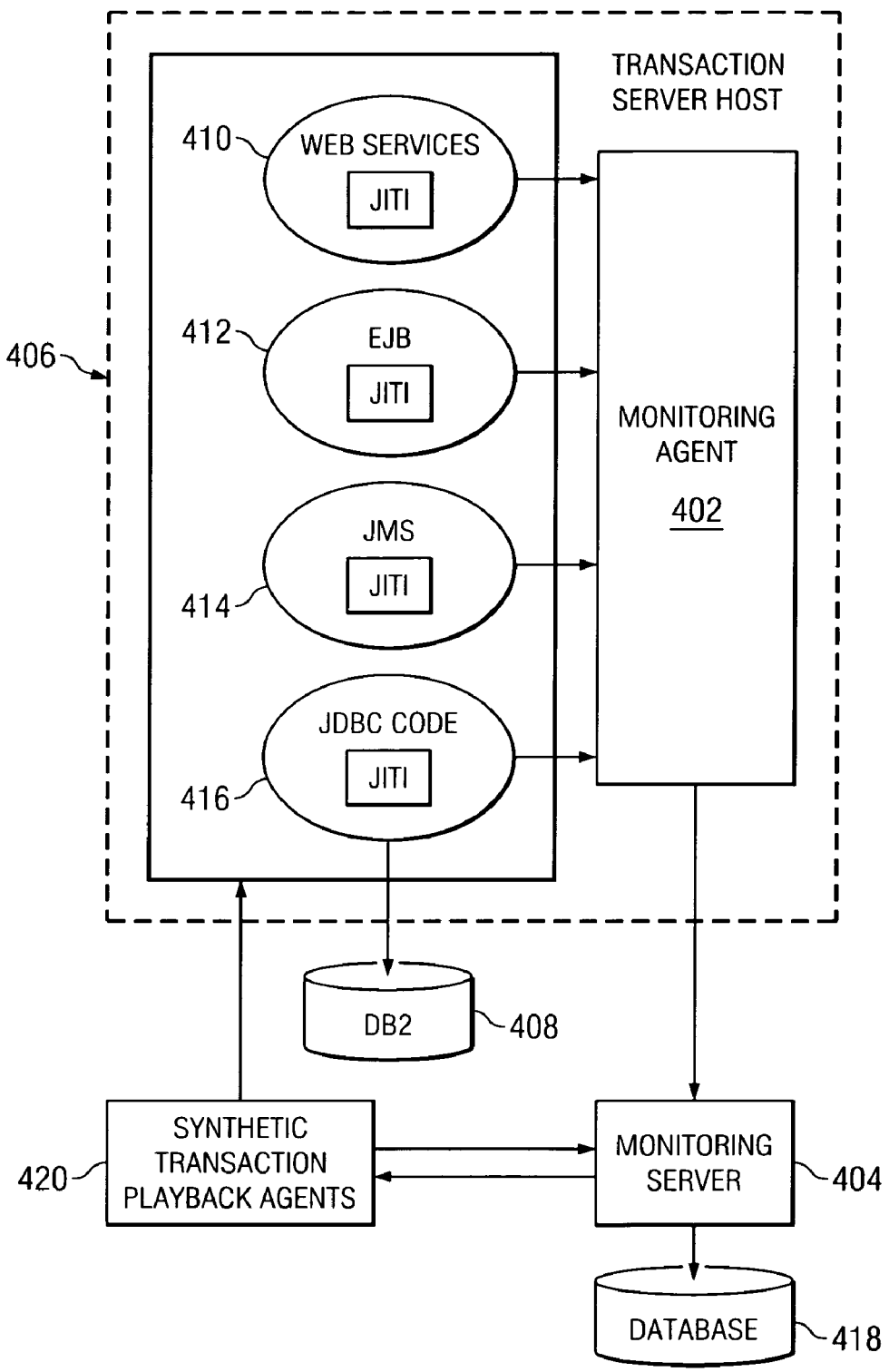
FIG. 4 is an exemplary diagram illustrating how just-in-time-instrumentation may be implemented within the enterprise system shown in FIG. 3 in accordance with an illustrative embodiment of the present invention.

FIG. 4 is an exemplary diagram of how JITI may be implemented within the enterprise system shown in FIG. 3 in accordance with an illustrative embodiment of the present invention. JITI may be implemented using Java Virtual Machine Profiling Interface (JVMPI), which allows for obtaining profiling data from the Java Virtual Machine by providing an interface between the Java Virtual Machine and an in-process JITI monitoring agent, such as monitoring agent 402. As each class is loaded by the Java Virtual Machine, the Java Virtual Machine sends a JVMPI event. Monitoring agent 402 listens to these JVMPI events and dynamically inserts JITI code snippets in each of the user's Java classes using byte-code insertion.

Monitoring server 404 is an example of a performance monitoring server, such as monitoring server 314 in FIG. 3. Transaction server host 406 is an example of a transaction server, such as transaction server 310 in FIG. 3. DB2 408 is an example back-end resource used by the transaction server. JITI resides within transaction server host 406. JITI custom "instruments" the user's code to add JITI's own logic to the user's code, without requiring users to make any code changes on themselves.

In this illustrative example, JITI is shown to be implemented in Web Services 410, Enterprise Java Beans 412, JMS 414, and Java Database Connectivity (JDBC) 416 code. When a call is made by one of these component codes, a JITI "probe" is inserted into the call. Thus, a JITI probe will be inserted into each DB2 call the user's code makes, each JMS call the user's codes makes, etc. A JITI monitoring agent, such as monitoring agent 402, passively listens to each call to determine the URL for the transaction as well as each sub-transaction associated with that URL. In other words, JITI may be used to passively identify what URLs are involved in a transaction, and what subtransactions (e.g., DB2, JMS, Web Service, Remote Method Invocation (RMI) calls) are initiated from those URLs. The monitored transaction data obtained by monitoring agent 402 may be uploaded to monitoring server 404.

As JITI probes may be used to identify the internal components of a transaction by tracking the transaction throughout the system to determine the URLs visited and associated transaction parameters, the information obtained by JITI monitoring agent 402 may also be used to determine whether a transaction is safe or unsafe. Each recorded transaction has an attribute that is marked as safe or unsafe, and this attribute and the transactions' associated URLs and transaction parameters are stored in a database, such as database 418. Those transactions marked as unsafe are added to a JITI unsafe transaction list stored in database 418. The unsafe transaction list may be stored as an XML document.

The unsafe transactions found by the JITI probes are compared against a configurable master list of known unsafe transactions. The master list may be a hardcoded file stored as an XML document in database 418. The master unsafe transaction list may include default transactions known to be inherently unsafe, such as any DB2 insert or update, or JMS, Web Service, and RMI calls. When a transaction match is found from a comparison of the two lists, the recorded transaction is deemed unsafe. A system administrator may then override parameters in the recorded transaction with test values to make the currently unsafe transaction safe.

When the system administrator overrides parameters in the transactions, monitoring server 404 may also download the transaction signatures to JITI monitoring agent 402. At this point, JITI monitoring agent 402 may then make its own decisions on whether or not to override parameters in current transactions based on these previously recorded transaction signatures. Once JITI overrides unsafe parameters in the transactions, those transactions may also be scheduled for playback, as those transactions have been modified to now include safe parameter values.

When a test value is used to override a particular transaction, this test value is stored in database 418. If any subsequent transaction is recorded having the same signature (e.g., a DB2 call matches a previously overridden call, a JMS message matches a previously overridden call, or a URL parameters matches a previously overridden URL parameter in a transaction), JITI may be used to automatically override the parameters with the stored test values and schedule for transaction for playback. For example, DB2, JMS, Web Service, and RMI calls all contain defined parameters and locations for those parameters. As the JITI probe is already present at the DB2 level, JMS level, and Web Services level for monitoring purposes, when JITI listens in on the customer code to detect a flag that indicates that a particular parameter value is found, JITI may override the value by inserting a modified value into the code associated with the particular parameter if a flag is detected. Likewise, if JITI detects a different parameter value, JITI will insert a modified value associated with that particular parameter.

It should be noted that when modifying parameters in a transaction, steps are taken to prevent overriding the actual customer transaction. When the synthetic transaction engine is run on a playback engine, a synthetic transaction agent may indicate in its playback request to the transaction server that the transaction is a synthetic transaction. For instance, a synthetic transaction agent may pass a value in the header of the Web request that informs the transaction server that if the value passed matches a transaction parameter in the request, JITI will perform the override. The value may be passed to the transaction server in an added header in the request. Headers associated with each Web request typically include the target URL, the server name, what type of data is expected, and the like.

Monitoring server 404 also informs synthetic transaction engines playback agents 420 in the enterprise which recorded transactions are scheduled to be played back. Monitoring server 404 sends transaction playback schedules and transaction specifics to synthetic transaction playback agents 420. Synthetic transaction engine playback agents 420 pull these transactions from database 418 and play them back. Synthetic transaction playback agent 420 sends the results of the playback to monitoring server 404.

Figure 5:
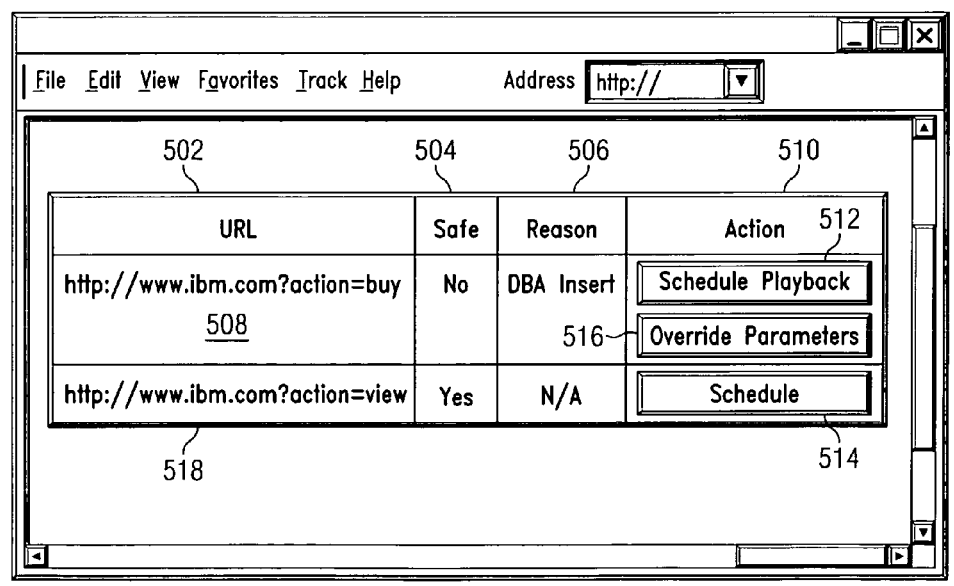
FIG. 5 is an exemplary management console display showing sets of safe and unsafe transactions in accordance with an illustrative embodiment of the present invention.

FIG. 5 is an exemplary management console display showing sets of safe and unsafe transactions in accordance with an illustrative embodiment of the present invention. Management console 500 may be implemented in monitoring server 314 in FIG. 3. Management console 500 allows for viewing and managing the sets of safe and unsafe transactions. For example, management console 500 may be used to query and modify unsafe transactions to make them safe.

In this illustrative example, management console 500 is shown to comprise a list of recorded transactions. This recorded transaction list may be stored in a database, such as database 418 in FIG. 4. Management console 500 pulls recorded transactions from the database to display, and using an attribute that indicates whether a transaction listed is safe or unsafe, the console suggests to the user that a transaction may be playback as is (safe transaction), or the transaction should be modified before playback (unsafe transaction).

In management console 500, information about each transaction in the list is displayed to a user. For example, URL field 502 may be used to provide information about the URL of a transaction (e.g., http://ibm.com?action=buy). It should be noted that although the management console display in FIG. 5 allows for overriding a transaction parameter at the URL level, the management console may also provide the user with the option of overriding the parameter at other levels, including a DB2 level, JMS server level, Web server level, etc. The levels all comprise defined areas in-which the parameters that are being used may be overridden.

Safe field 504 may be used to indicate whether a transaction is currently safe or unsafe. If the transaction is unsafe, reason field 506 may be used to indicate why the transaction is unsafe. For example, transaction 508 is marked as unsafe because the transaction contains a DBA insert subtransaction.

In addition to viewing transaction information, management console 500 also allows a user to manage these transactions. For example, users may perform actions on the transactions via action field 510, which comprises selectable buttons. As shown, the selectable buttons may include schedule playback buttons 512 and 514, which are used to playback the respective recorded transactions. The action field of transaction 508 also includes override parameters button 516, which is used to modify the parameters of the unsafe transaction. When selecting the override parameters button, the user is provided with an input screen that allows the user to override a current parameter value of the transaction. An example of this input screen will be further described in FIG. 6.

Once parameters for a transaction have been overridden, safe field 504 may be updated to indicate that the transaction is now safe for playback, such as shown in transaction 518. Similarly, the transaction's reason field will also be updated to reflect a safe transaction, and the system administrator may schedule playback using schedule playback button 512 in action field 510 without causing destructive effects in the enterprise.

FIG. 6 is an exemplary management console for overriding transaction parameters in an unsafe transaction in accordance with an illustrative embodiment of the present invention. Management console 600 allows a user to modify the recorded transaction so that the transaction may be played back without having adverse side effects on the enterprise back-end. Management console 600 is shown to the user when the user wants to override a particular hazardous parameter, such as by selecting override parameters button 516 in FIG. 5.

In this illustrative example, transaction 508 selected in FIG. 5 is shown to have parameters "credit card number" 602 and "action" 604. If the user wants to modify the value of the credit card number parameter from the customer's actual credit card number to a dummy credit card number, the user may enter the dummy number, such as "9999999999999999", into override value field 606. This dummy number allows the recorded transaction to be processed like an actual transaction for performance monitoring purposes, but without causing any detrimental effects, such as the customer's credit card being charged again. Thus, the user may override the existing customer number with the dummy number, which will be used when the recorded transaction is played back.

The user may also have the option of overriding the destructive parameter globally. If the user selects global override option 608, the parameter value will automatically be overridden if the parameter value is detected in other transactions (e.g., a customer uses the same credit card number for a subsequent purchase transaction). The modified parameter settings may be saved and the user is returned to management console 500 in FIG. 5, wherein the user may select to schedule playback of the modified, and now safe, transaction.

As previously mentioned, the global overriding of a destructive parameter may be performed using JITI. Once a test value has been defined for a transaction parameter, JITI may be used to automatically schedule playback for transactions having the same signature as the overridden parameter. Instead of manually enumerating and addressing every unsafe transaction, JITI may dynamically override unsafe transactions with safe test values to allow them to be synthetically played back. Subsequent transactions with the same signature (i.e., servlet entry values) would be dynamically modified by JITI and be flagged as safe. For example, a customer buys a book, and before the recorded transaction is scheduled for playback, the customer's credit card parameters are overridden using the management console. If the customer then buys a radio (i.e., a different transaction type), JITI may automatically schedule the transaction comprising the different item for playback using the same credit card parameter modification used for the book purchase transaction. Thus, if the system already knows how to make the transaction safe for playback, JITI will modify the transaction automatically and schedule the playbacks.

Turning now to FIG. 7, a flowchart outlining an exemplary operation for identifying unsafe synthetic transactions and modifying parameters for playback in accordance with an illustrative embodiment of the present invention is shown. The process illustrated in FIG. 7 may be implemented using bytecode inserted probes, such as JITI probes, to identify transactions. This instrumentation allows a focus on data of interest to be collected without application interruption.

The process begins with having bytecode instrumentation enumerate, for each step (URL) in the business transaction, the various enterprise entities a transaction has traversed and the parameters that have been passed in the transaction (step 702). For example, in an application instrumented with JITI, a JITI probe inserted at a customizable entry point URL for the purpose of monitoring or collecting data about a business transaction may be used to identify the internals of each transaction.

Once the transactions are known, the transactions observed by JITI are identified as being 'safe' or 'unsafe', wherein the unsafe transactions are added to a configurable list of unsafe transactions discovered by the bytecode probes (step 704). The configurable list provides an initial filter which is used to identify which transactions are approved (safe) and that are allowed to be played back, and which transactions are known to be unsafe and need to be modified. Possible unsafe transactions include transactions that reference back-end systems, such transactions issuing a DB2 update or delete or transactions having Web Service, JMS, or RMI calls. It may be beneficial to assume conservatively that all transactions that may potentially be unsafe are unsafe until the administrator of the monitoring system instructs otherwise. The configurable list may store as an XML document in a database, such as database 418 in FIG. 4.

The configurable list of unsafe subtransactions discovered by the bytecode instrumentation is then compared against the static list of known unsafe transaction types (step 706). The static list of known unsafe subtransaction types comprises a list of unsafe transaction types by default. For example, any DB2, JMS, or Web Services calls may fall into this category. This static list may also be stored as an XML document in a database, such as database 418 in FIG. 4.

If the comparison results in a match of the transaction type (step 708), the transaction is marked as 'unsafe' and the system will not use that recording for synthetic playback (step 710). The transaction may be marked unsafe by the monitoring server and stored in the monitoring server database. Turning back to step 708, if the comparison does not result in a match, the transaction is deemed safe and the system administrator may now schedule the transaction for synthetic playback (step 716).

Once each transaction in a set of transactions has been distinguished as safe or unsafe, both the safe and unsafe transactions may be displayed in a management console (step 712), such as displayed in management console 500 in FIG. 5. When a system administrator selects a specific unsafe transaction, the subtransaction the system detected as unsafe and the incoming servlet parameters that generated the subtransaction are displayed to the administrator in the management console, such as in management console display shown in FIG. 6. Within this display, the system administrator may override the parameters in the unsafe transaction with test values so as to make the transaction safe for playback (step 714). As the transaction is now deemed safe, the system administrator may now schedule the transaction for playback (step 716).

FIG. 8 is a flowchart outlining an exemplary operation for using just-in-time-instrumentation (JITI) to identify unsafe synthetic transactions and modify parameters for automated transaction playback in accordance with an illustrative embodiment of the present invention is shown. The process described in FIG. 8 may be utilized once the process in FIG. 7 has been iterated through.

In particular, the initial part of the process (steps 802 through 808) illustrated in FIG. 8 is similar to the process depicted in FIG. 7. However, in step 810, rather than displaying safe and unsafe transactions in a management console and requiring a system administrator to manually override each destructive parameter in the unsafe transactions, JITI may be used to identify test parameters associated with the parameter in the transaction. JITI may identify the associated parameters by identifying those previously modified transactions having the same signature (servlet entry values) as the current transaction. JITI may use the associated parameters in a previous transaction to automatically override the parameter for the current transaction (step 812). In other words, subsequent transactions with the same signature may be dynamically modified by JITI and be flagged as safe. Thus, as the mechanism of the present invention system already knows how to make the transaction safe, it may employ bytecode instrumentation to modify the transaction automatically and schedule the transaction playback (step 814).

Thus, a method, apparatus, and computer instructions are provided for detecting unsafe transactions and overriding parameters in the transactions to be able to automatically playback the transaction in a non-destructive manner. With the different aspects of the present invention, the transaction server is not required to be reprogrammed to detect unsafe transactions, but rather a monitoring engine in the synthetic transaction layer may be used to identify transactions. Although unsafe transactions may be identified at the URL level, using just-in-time-instrumentation allows for detecting unsafe transactions at other levels in the system, such as DB2, JMS, Web Services, etc. levels. When an unsafe transaction is detected, the mechanism of the present invention allows for overriding parameters in the transaction, thus allowing the transaction to be automatically played back without causing adverse side effects in the back-end of the enterprise system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using bytecode instrumentation to dynamically override unsafe parameters for synthetic playback, the computer implemented method comprising:
   identifying that a transaction comprises an unsafe parameter by identifying each universal resource locator traversed and parameters passed in the transaction, adding the transaction identified using the bytecode instrumentation as having unsafe parameters to a configurable list of unsafe transactions, wherein the configurable list filters which transactions are safe for playback and which transactions are unsafe for playback, comparing the configurable list against a static list of known unsafe transaction types, marking the transaction as unsafe if the comparison results in a match, and marking the transaction as safe if the comparison does not result in a match;
   determining, based on the parameters passed, that the unsafe parameter in the transaction is associated with a test parameter in a previously overridden transaction by determining that the unsafe parameter comprises a same servlet entry value as a previously overridden transaction parameter;
   dynamically overriding the unsafe parameter with the test parameter to make the transaction safe for synthetic playback; and
   responsive to overriding the unsafe parameter with the test parameter, playing back the transaction;
   wherein the identifying, determining, and overriding steps are performed using bytecode instrumentation.

* * * * *